(12) United States Patent
Johnston (10) Patent No.: US 7,469,299 B2
(45) Date of Patent: Dec. 23, 2008

(54) BRIDGING USER AGENT AND A PROXY SERVER FOR SUPPORTING NETWORK SERVICES

(75) Inventor: Alan B. Johnston, St. Louis, MO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1227 days.

(21) Appl. No.: 09/983,691

(22) Filed: Oct. 25, 2001

(65) Prior Publication Data
US 2003/0097447 A1    May 22, 2003

(51) Int. Cl.
*G06F 15/16* (2006.01)
*G06F 15/173* (2006.01)

(52) U.S. Cl. .............. 709/237; 709/228; 370/351; 370/902

(58) Field of Classification Search .......... 709/227, 709/230, 228, 237; 370/356, 467, 522, 352, 370/351, 902; 379/93.31–93.32; 455/401
See application file for complete search history.

(56) References Cited

U.S. PATENT DOCUMENTS

| | | | |
|---|---|---|---|
| 4,850,012 A | 7/1989 | Mehta et al. | |
| 5,329,578 A | 7/1994 | Brennan et al. | |
| 5,563,938 A | 10/1996 | Soshea et al. | |
| 5,928,323 A | 7/1999 | Gosling et al. | |
| 5,944,781 A | 8/1999 | Murray | |
| 6,141,341 A | 10/2000 | Jones et al. | |
| 6,161,008 A | 12/2000 | Lee et al. | |
| 6,201,805 B1* | 3/2001 | Strathmeyer | 370/356 |
| 6,243,443 B1 | 6/2001 | Low et al. | |
| 6,249,576 B1 | 6/2001 | Sassin et al. | |
| 6,256,389 B1 | 7/2001 | Dalrymple et al. | |
| 6,282,281 B1 | 8/2001 | Low | |
| 6,292,553 B1 | 9/2001 | Fellingham et al. | |
| 6,307,929 B1 | 10/2001 | Baiyor et al. | |
| 6,393,289 B1 | 5/2002 | Bunting et al. | |
| 6,421,324 B1 | 7/2002 | Boyle et al. | |
| 6,445,682 B1 | 9/2002 | Weitz | |
| 6,501,740 B1* | 12/2002 | Sun et al. | 370/261 |
| 6,577,622 B1* | 6/2003 | Schuster et al. | 370/352 |
| 6,614,781 B1* | 9/2003 | Elliott et al. | 370/352 |
| 6,856,618 B2* | 2/2005 | Strathmeyer et al. | 370/356 |
| 6,990,081 B2* | 1/2006 | Schaefer et al. | 370/260 |

OTHER PUBLICATIONS

Handley et al. RFC 2543, SIP: Session Initiation Protocol, Network Working Group, Mar. 1999, sessions 1-7.
Wedlund et al., Mobility Support using SIP, ACM 1999 1-58113-129-1/99/08, pp. 76-82.

* cited by examiner

*Primary Examiner*—David Lazaro (57) ABSTRACT

An approach for providing voice processing over a packet switched network is disclosed. A communication system includes a special forking proxy server that receives a message for establishing a session between a calling user agent and a called user agent. The message has a first payload corresponding to a first call leg. The system also includes a bridging user agent that communicates with the first network element and generates a response that contains the first payload and a second payload that corresponds to a second call leg. The bridging user agent is configured to bridge the first call leg and the second call leg to establish a session between the calling user agent and the called user agent. The special forking proxy server is configured to fork an acknowledgement message from the calling party to acknowledge the session establishment by the called user agent. The present invention has particular applicability to SIP (Session Initiation Protocol) IP (Internet Protocol) telephony services.

29 Claims, 6 Drawing Sheets

BRIDGING USER AGENT AND A PROXY SERVER FOR SUPPORTING NETWORK SERVICES

FIELD OF THE INVENTION

The present invention relates to a communications system, and is more particularly related to call processing over a data network.

BACKGROUND OF THE INVENTION

The popularity and convenience of the Internet has resulted in the reinvention of traditional telephony services. These services are offered over a packet switched network with minimal or no cost to the users. IP (Internet Protocol) telephony, thus, have found significant success, particularly in the long distance market. In general, IP telephony, which is also referred to as Voice-over-IP (VoIP), is the conversion of voice information into data packets that are transmitted over an IP network. Users also have turned to IP telephony as a matter of convenience in that both voice and data services are accessible through a single piece of equipment, namely a personal computer. The continual integration of voice and data services further fuels this demand for IP telephony applications.

The Session Initiation Protocol (SIP) has emerged to address the signaling of calls over an IP network. As an end-to-end protocol, SIP advantageously permits the end nodes with the capability to control call processing. By contrast, traditional telephony services are totally controlled by the intermediate network components; that is, the switches have full control over call establishment, switching, and call termination. In the SIP architecture, it is sometimes desirable for an intermediate network element to control the call processing. For example, codec (coder/decoder) incompatibility may require network intervention to ensure that the exchange of packets are meaningful.

To address the above problem, one conventional approach is to employ a proxy/user agent software architecture that is co-located. Additionally, proprietary, non-SIP protocols have been developed in the conventional system. A number of drawbacks attend this traditional SIP system. The conventional approach centralizes complexity by utilizing a proxy/user agent software architecture that is co-located. The use of proprietary protocols hinders industry deployment and acceptance. Further, under the conventional approach, scalability is reduced, in part, because of the centralized approach.

Therefore, there is a need for an approach for efficiently performing a number of IP telephony services. There is also a need to preserve a standard architecture to promote deployment of network services, while minimizing system complexity. There is also a need to enhance scalability.

SUMMARY OF THE INVENTION

These and other needs are addressed by the present invention in which network elements of a communication system that provides voice processing support a number of network services, including an anonymizer service, a Codec Conversion service, a network bridging service, and a firewall service. According to one embodiment of the present invention, the network elements are SIP (Session Initiation Protocol) devices; i.e., a bridging user agent and a special forking proxy server. The bridging user agent (BUA) permits four SDP (Session Description Protocol) message bodies to be exchanged in a single transaction (e.g., an INVITE/200 OK/ACK exchange) to bridge two call legs. The Special Forking Proxy (SFP) server communicates with the BUA using standard SIP messages; the SFP server forks all requests, including, for example, ACKs and BYEs. The above approach advantageously enhances scalability, while maintaining a standardized architecture.

In one aspect of the present invention, a method is provided for supporting voice processing over a packet switched network. The method includes receiving a message for establishing a session between a calling user agent and a called user agent. Also, the method includes establishing the session via a network element that is configured to bridge a first call leg and a second call leg associated with the calling user agent and the called user agent, respectively. The establishing step comprises forking a message acknowledging establishment of the session from the calling user agent.

Another aspect of the present invention, a communication system for providing voice processing over a packet switched network is disclosed. The communication system comprises a first network element that is configured to receive a message for establishing a session between a calling user agent and a called user agent. The message has a first payload corresponding to a first call leg. The system also includes a second network element that is configured to communicate with the first network element and to generate a response that contains the first payload and a second payload that corresponds to a second call leg. The second network element is configured to bridge the first call leg and the second call leg to establish a session between the calling user agent and the called user agent, and the first network element is configured to fork an acknowledgement message from the calling party to acknowledge the session establishment by the called user agent.

Another aspect of the present invention, a network apparatus for supporting voice processing over a packet switched network is disclosed. The apparatus includes a communication interface that is configured to receive a message for establishing a session between a calling user agent and a called user agent. The apparatus also includes a processor that is coupled to the communication interface and is configured to establish the session via a bridging user agent that is configured to bridge a first call leg and a second call leg associated with the calling user agent and the called user agent, respectively. The processor is configured to fork a message acknowledging establishment of the session from the calling user agent.

Another aspect of the present invention, a network apparatus for supporting voice processing over a packet switched network is disclosed. The apparatus includes a communication interface that is configured to receive a message for establishing a session between a calling user agent and a called user agent from a proxy server. The apparatus also includes a processor that is coupled to the communication interface and is configured to establish the session by bridging a first call leg and a second call leg associated with the calling user agent and the called user agent, respectively. The proxy server is configured to fork a message acknowledging establishment of the session from the calling user agent.

Another aspect of the present invention, a network apparatus for providing voice processing over a packet switched network is disclosed. The network apparatus includes means for receiving a message for establishing a session between a calling user agent and a called user agent; and means for establishing the session via a network element configured to bridge a first call leg and a second call leg associated with the calling user agent and the called user agent, respectively. The establishing means includes means for forking a message acknowledging establishment of the session from the calling user agent.

In yet another aspect of the present invention, a computer-readable medium carrying one or more sequences of one or more instructions for providing voice processing over a packet switched network is disclosed. The one or more sequences of one or more instructions include instructions which, when executed by one or more processors, cause the one or more processors to perform the step of receiving a message for establishing a session between a calling user agent and a called user agent. Another step includes establishing the session via a network element configured to bridge a first call leg and a second call leg associated with the calling user agent and the called user agent, respectively. The establishing step includes forking a message acknowledging establishment of the session from the calling user agent.

Still other aspects, features, and advantages of the present invention are readily apparent form the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is discussed with respect to the Session Initiation Protocol (SIP), it should be appreciated that one of ordinary skill in the art would recognize that the present invention has applicability to other equivalent communication protocols.

Figure 1:
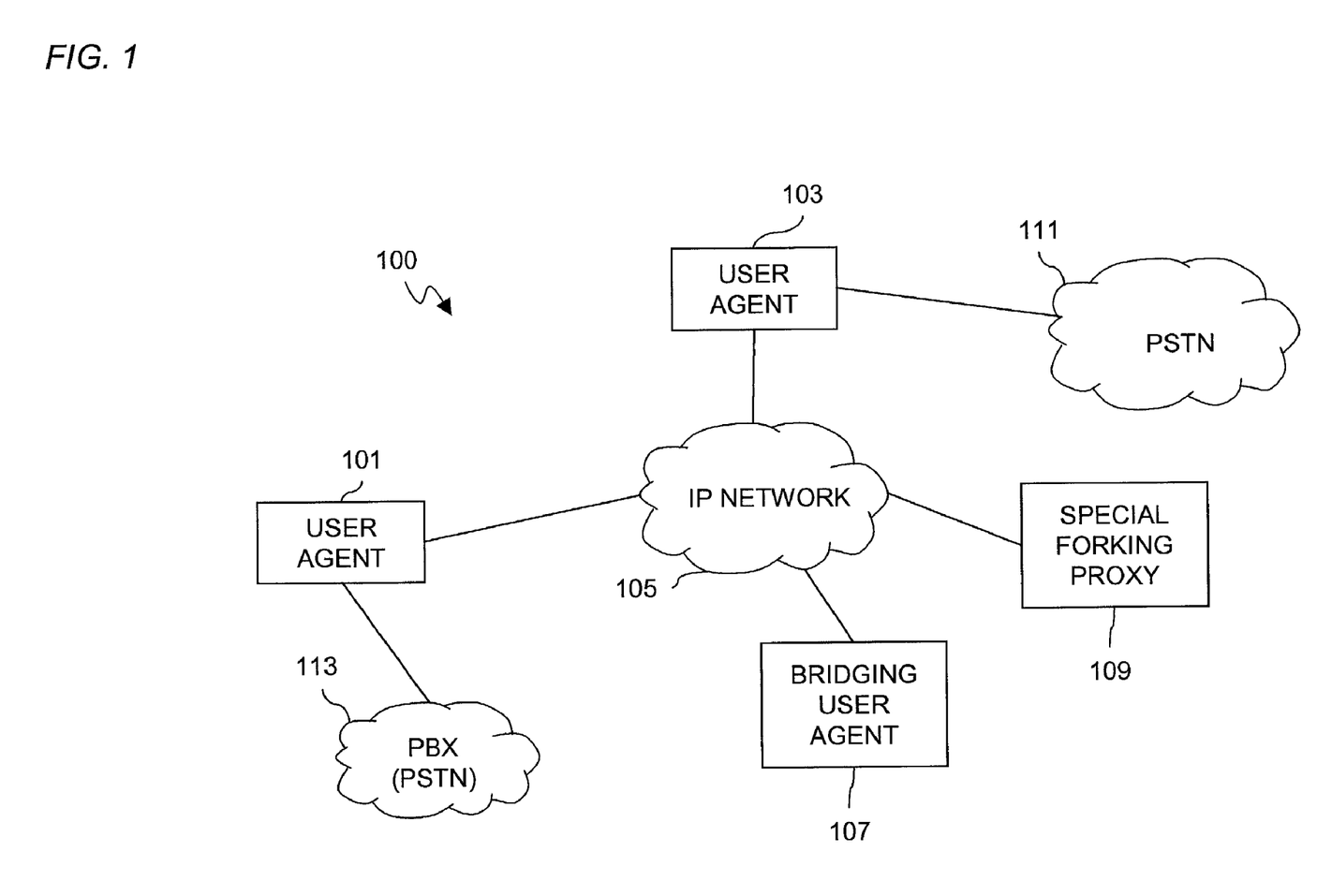
FIG. 1 is a diagram of a communication system including a bridging user agent and a special forking proxy server, according to an embodiment of the present invention.

FIG. 1 shows a diagram of a communication system including a bridging user agent and a special forking proxy server, according to an embodiment of the present invention. In particular, the communication system 100 supports IP telephony services among multiple user agents 101, 103, which are more fully described below. The user agents 101, 103 exchange messages over the IP network 105. The system 100 includes a SIP device, herein referred to as a "bridging user agent" (BUA) 107; the BUA 107 acts as a modified "back-to-back user agent". A special forking proxy (SFP) server 109 communicates with the user agents 101, 103 and the BUA 107 using standard SIP messages via the IP network 105. As shown, the user agent 103 is connected to the Public Switched Telephone Network (PSTN) 111. In this example, the user agent 101 has connectivity to a Private Branch Exchange (PBX) 113, which in turn, passes calls through to the PSTN 111; alternatively, the user agent 101 may couple to the PSTN 111 directly.

Because the PSTN 111 is connected to the IP network 105, communication among voice stations (not shown) that are serviced through the PSTN 111, and personal computers that are attached to the IP network 105 can be established (e.g., Voice over IP (VOIP)). Attention is now drawn to transmission of voice calls over the IP network 105. Four possible scenarios exist with the placement of a VOIP call: (1) phone-to-phone, (2) phone-to-PC, (3) PC-to-phone, and (4) PC-to-PC. In the first scenario of phone-to-phone call establishment, a voice station is switched through PSTN 111 by a switch to a VOIP gateway (not shown), which forwards the call through the IP network 105. The packetized voice call is then routed through the IP network 105, exiting the IP network 105 at an appropriate point to enter the PSTN 111 and terminates at a voice station. Under the second scenario, a voice station places a call to PC through a switch to the PSTN 111. This voice call is then switched by the PSTN 111 to a VOIP gateway (not shown), which forwards the voice call to a PC via the IP network 105. The third scenario involves a PC that places a call to a voice station. Using a voice encoder, the PC introduces a stream of voice packets into the IP network 105 that are destined for a VOIP gateway (not shown). A VOIP gateway (not shown) converts the packetized voice information into a POTS (Plain Old Telephone Service) electrical signal, which is circuit switched to the voice station. Lastly, in the fourth scenario, a PC establishes a voice call with a PC; in this case, packetized voice data is transmitted from the PC via the IP network 105 to another PC, where the packetized voice data is decoded.

The system 100 employs SIP to exchange messages. A detailed discussion of SIP and its call control services are described in IETF RFC 2543 and IETF Internet draft "SIP Call Control Services", Jun. 17, 1999; both of these documents are incorporated herein by reference in their entireties. SIP messages are either requests or responses. The user agents 101, 103 may behave as either a user agent client (UAC) or a user agent server (UAS), depending on the services that the system 100 is executing. In general, a user agent client issues requests, while a user agent server provides responses to these requests.

SIP defines six types of requests, which are also referred to as methods. The first method is the INVITE method, which invites a user to a conference. The next method is the ACK method, which provides for reliable message exchanges for invitations in that the client is sent a confirmation to the INVITE request. That is, a successful SIP invitation includes an INVITE request followed by an ACK request.

Another method is the BYE request, which indicates to the UAS that the call should be released. In other words, BYE terminates a connection between two users or parties in a conference. The next method is the OPTIONS method; this method solicits information about capabilities and does not assist with establishment of a call. Lastly, the REGISTER provides information about a user's location to a SIP server.

According to an embodiment of the present invention, the BUA 107 and the SFP server 109 enables efficient implementation of a number of SIP IP Telephony services. These SIP network elements 107 and 109 employ special SIP messaging to support the SIP IP Telephony services. These services include an Anonymizer service, a Codec Conversion service, a Network Bridging service, and a Firewall service. The Anonymizer service allows a user to place an "anonymous" IP Telephony call. In IP Telephony, communication with another user agent requires that the called party know the caller's IP address, domain name, and other private information. A call through an Anonymizer service removes all traceable information about the caller by proxying both signaling and media. The Codec Conversion service allows two user agents to establish a communication even though they have no common codec. The Codec Conversion service proxies the media packets, converting from one codec to another and bridging the two separate media streams. The Network Bridging service allows two user agents that utilize completely different media transports schemes to establish a session. Since SIP can be used for signaling, a media session transported using schemes such as RTP (Reliable Transport Protocol)/UDP (User Datagram Protocol), RTP/TCP (Transmission Control Protocol), RTP/SCTP (Stream Control Transmission Protocol), and AAL (ATM Adaptation Layer)/ATM (Asynchronous Transfer Mode) among many others; this service allows calling between schemes in an efficient way. The Firewall service allows two user agents that are separated by a firewall to establish a session. Since the firewall will block all unauthorized packet exchange between the user agents, an intermediary proxy is needed for both the signaling and media that is under the control of the firewall. Assuming the user agents are authorized by the Firewall administrator to establish a session, each user agent signals and sends media to the firewall service which relays the information across the firewall in a secure manner.

As previously described, conventional implementations of the above services assume that the proxy/user agent software are co-located, or that a non-SIP protocol is used between them. This assumption represents an undesirable centralization of complexity and function that is not consistent with the SIP architecture in general. By contrast, the system 100 cleanly distributes the roles of the media component and the signaling component, as well as the requirements of the Proxy Server and user agent, without introducing proprietary SIP messages. This approach is implemented through the use of the BUA 107 and the SFP server 109 for handling of the media and signaling components, respectively.

The bridging user agent 107 is a new type of SIP device, which, as earlier mentioned, is a modified "back-to-back user agent." In an exemplary embodiment, the bridging user agent 107 includes two user agents, which are controlled by a single SIP address. This permits the use of one INVITE message to establish two SIP sessions. A bridging user agent 107 is different from a conventional user agent in that upon receipt of an INVITE containing a SDP message body, it returns a 200 OK response containing two SDP (Session Description Protocol) message bodies, one for each leg of the call. SDP is detailed in IETF (Internet Engineering Task Force) RFC 2327, which is incorporated herein by reference in its entirety. In addition, the BUA 107 expects an ACK response which also contains an SDP message body. Thus, in a single INVITE/200 OK/ACK exchange, four SDP message bodies are exchanged that allow the two bridged sessions to be established. Standard SIP allows message bodies in INVITE, 200 OK, and ACK messages, but conventional user agent behavior is to only allow SDP in either the INVITE or the ACK, not both.

The present invention, thus, utilizes SIP in a matter that does not violate any rules associated with an individual message. Accordingly, any number of stateless or stateful proxies can be in the path between the bridging user agent 107 and the Special Forking Proxy 109; that is, the BUA 107 and the SFP server 109 are transparent to other standard SIP network elements. The bridging user agent 107 is different from a standard Back-to-Back user agent in that it returns a 200 OK response to the INVITE with two sets of sdp, thereby permitting the efficient use of SIP transport.

With respect to the special forking proxy server 107, this new type of SIP Proxy server exchanges standard SIP messages with the calling user agent 101, 103, and the bridging user agent 107. The SFP server 107 permits the implementation of the above mentioned services in an efficient manner. In particular, the user agents 101, 103 do not require any special software or knowledge of the mechanisms of the BUA 107 and the SFP server 109. Further, the BUA 107 and SFP server 109 do not require any new extensions to the SIP standard.

Also, the system 100 allows flexibility in the Call-ID (identification), which uniquely identifies the SIP session. Depending on the service implemented, the same Call-ID can be used for the two legs (but with different tags), or different Call-IDs can be used. The logic that is needed to implement these features is present in the SFP server 109, which provides an efficient and scalable architecture in keeping with the intent of the SIP protocol. The SFP server 109 forks all requests, including ACKs and BYEs. In addition, the SFP server 109 holds final responses until the server 109 receives final responses from both forks before proxying the response. It is noted that forking, as defined in the SIP standard, is restricted to the INVITE method; for example, forking of BYE does not work, since the multiple responses that are received cannot be received reliably because of the absence of the ACK that is used for the INVITE method. The SFP server 109 allows all SIP methods to be forked and can receive the multiple message bodies.

Although the BUA 107 and the SFP server 109 are shown as two separate SIP network elements, it is recognized that this two processes can be combined into a single SIP network element, according to an embodiment of the present invention. To appreciate the present invention, a brief description of the SIP protocol architecture is now described with respect to FIG. 2.

Figure 2:
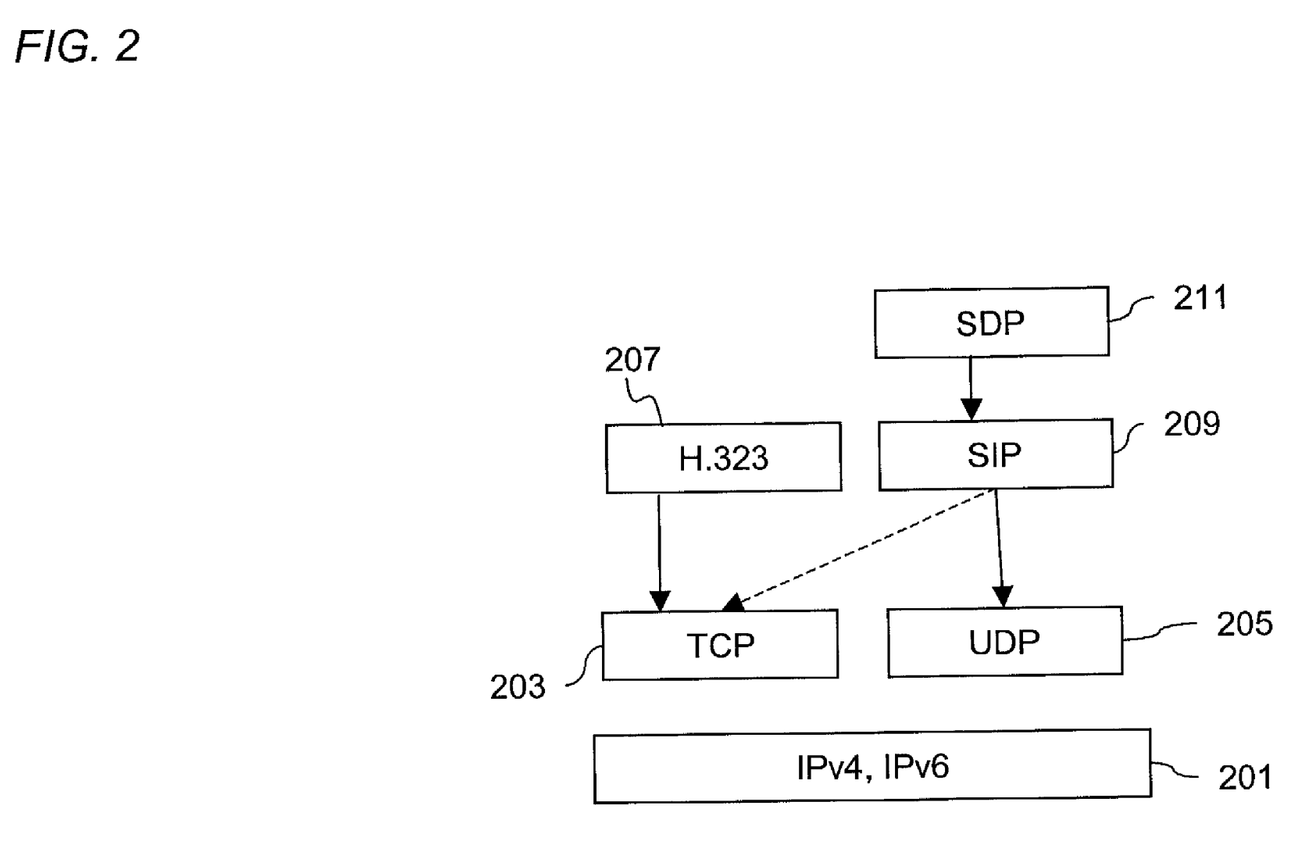
FIG. 2 is a diagram of an exemplary protocol architecture employed in the system of FIG. 1.

FIG. 2 is a diagram of an exemplary protocol architecture employed in the system of FIG. 1. The layered nature of the architecture provides protocol separation and independence, whereby one protocol can be exchanged or modified without affecting the other higher layer or lower layer protocols. It is advantageous that the development of these protocols can occur concurrently and independently.

The foundation of the architecture rests with the IP layer 201. The IP layer 201 provides an unreliable, connectionless data delivery service at the network level. The service is "unreliable" in the sense that the delivery is on a "best effort" basis; that is, no guarantees of packet delivery are made. IP is the de facto Internet working protocol standard. Current standards provide two versions of IP: Version 4 and Version 6. One of the key differences between the versions concerns addressing; under Version 4, the address fields are 32 bits in length, whereas in Version 6, the address field has been extended to 128 bits.

Above the IP layer 201 are the TCP (Transmission Control Protocol) 203 and the UDP (User Datagram Protocol) 205. The TCP layer 203 provides a connection-oriented protocol that ensures reliable delivery of the IP packets, in part, by performing sequencing functions. This sequencing function reorders any IP packets that arrive out of sequence. In contrast, the User Datagram Protocol (UDP) 205 provides a connectionless service that utilizes the IP protocol 201 to send a data unit, known as a datagram. Unlike TCP 203, UDP 205 does not provide sequencing of packets, relying on the higher layer protocols to sort the information. UDP 205 is preferable over TCP 203 when the data units are small, which saves processing time because of the minimal reassembly time. One of ordinary skill in the art would recognize that embodiments of the present invention can be practiced using either TCP 203 or UDP 205, as well as other equivalent protocols.

The next layer in the IP telephony architecture of FIG. 2 supplies the necessary IP telephony signaling and includes the H.323 protocol 207 and the Session Initiation Protocol (SIP) 209. The H.323 protocol 207, which is promulgated by the International Telecommunication Union (ITU), specifies a suite of protocols for multimedia communication. SIP 209 is a competing standard that has been developed by the Internet Engineering Task Force (IETF). SIP 209 is a signaling protocol that is based on a client-server model. It should be noted that both the H.323 protocol 207 and SIP 209 are not limited to IP telephony applications, but have applicability to multimedia services in general. In the preferred embodiment of the present invention, SIP 209 is used to create and terminate voice calls over an IP network 105. However, it is understood that one of ordinary skill in the art would realize that the H.323 protocol 207 and similar protocols can be utilized in lieu of SIP 209. Above SIP 209 is the Session Description Protocol (SDP) 211, which provides information about media streams in the multimedia sessions, as to permit the recipients of the session description to participate in the session.

As seen in FIG. 2, SIP 209 can utilize either TCP 203 or UDP 205. However, UDP 205 is adopted in the preferred embodiment of the present invention. Similar to other IETF protocols (e.g., the simple mail transfer protocol (SMTP) and Hypertext Transfer Protocol (HTTP)), SIP 209 is a textual protocol. As indicated earlier, SIP 209 is a client-server protocol, and as such, clients generate requests that are responded to by the servers.

Figure 3:
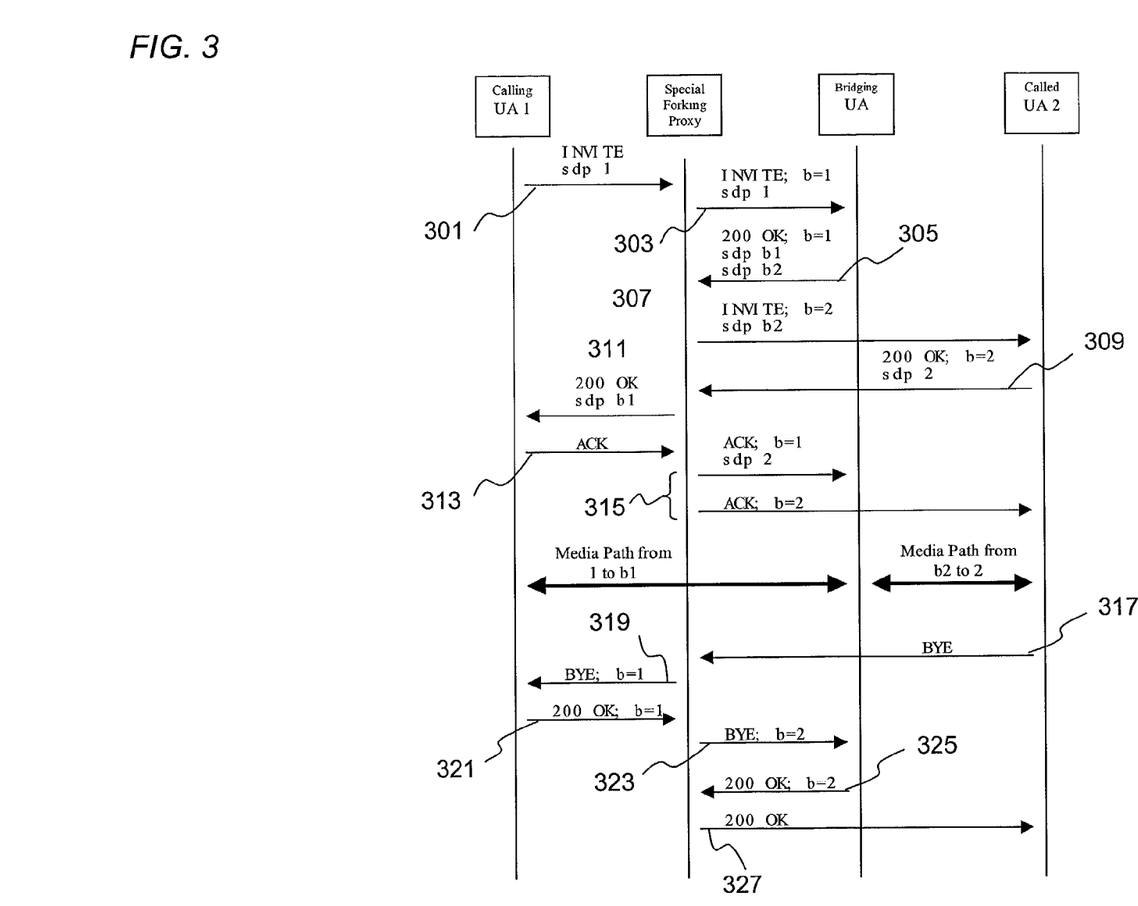
FIG. 3 is a diagram of a call flow for supporting various network services, according to an embodiment of the present invention.
Figure 4:
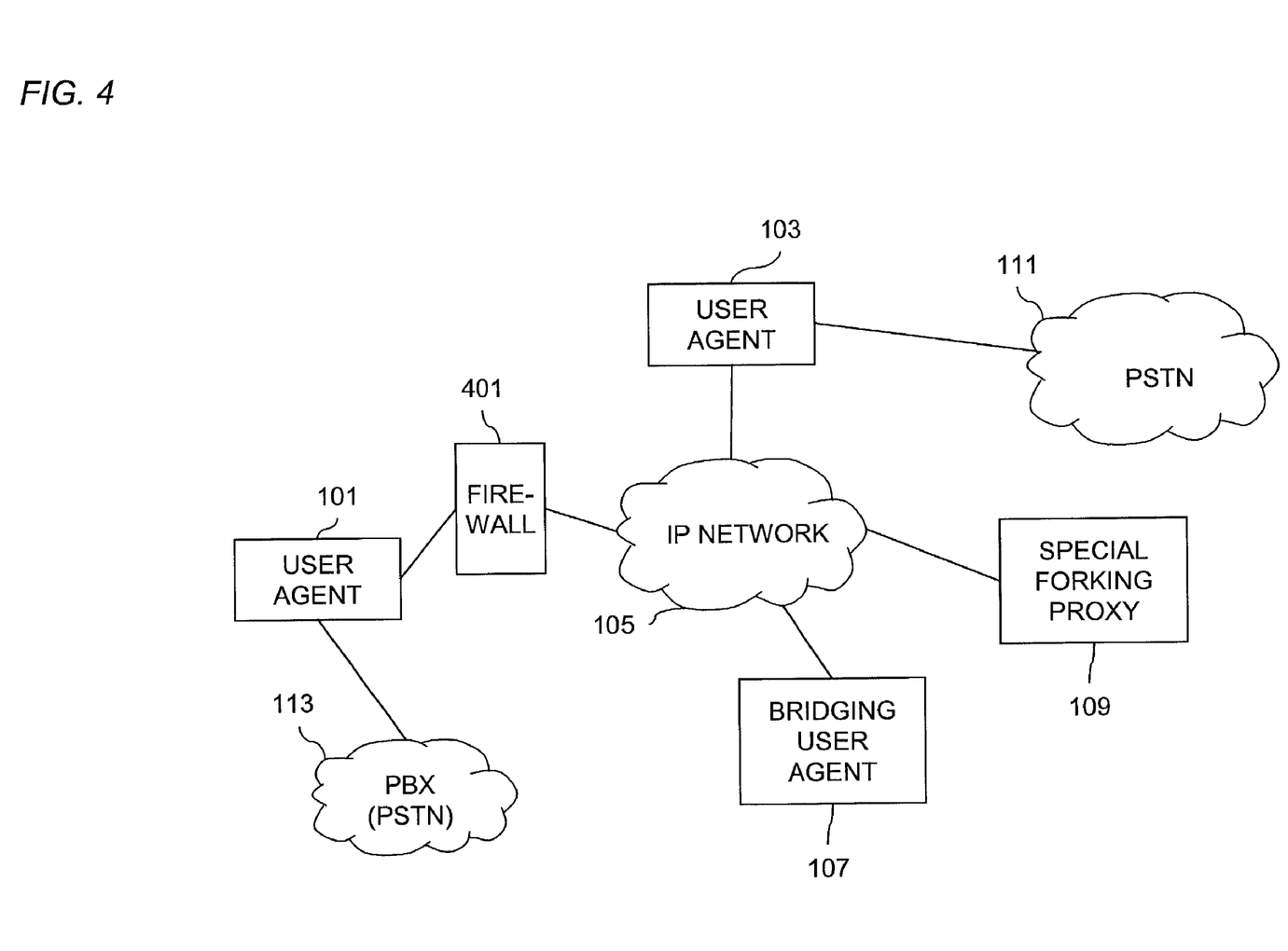
FIG. 4 is a diagram of a communication system capable of providing firewall services, according to an embodiment of the present invention.

FIG. 3 is a diagram of a call flow for supporting various network services, according to an embodiment of the present invention. In an exemplary embodiment, the previously described services (e.g., Anonymizer service, Codec Conversion service, Network Bridging service, and Firewall service) are implemented with the same call flows. The differences between the services are in the nature of the SDP message bodies and in the interaction of the SFP server 109 and other devices, such as a firewall (FIG. 4). In step 301, the user agent 101 sends an INVITE message to the SFP server 109 over the IP network 105, along with a SDP message body (i.e., payload), sdp 1. In turn, the SFP server 109, as in step 303, forwards the INVITE message (with a branch of 1; i.e., b=1) to the BUA 107. At this point, the BUA 107 returns a 200 OK message to the SFP server 109, per step 305, with two SDP message bodies (sdp b1 and sdp b2). Next, the SFP server 109 sends an INVITE to the user agent 103 (step 307), which responds with a 200 OK with a message body (sdp 2), as in step 309. In step 311, the SFP server 109 forwards the 200 OK message with the media characteristic of the BUA 107 (i.e., sdp b1) to the user agent 101. The user agent 101, as in step 313, acknowledges the 200 OK message with an ACK message.

In step 315, the SFP server 109 concurrently forwards ACKs to the BUA 107 and the user agent 103. The ACK associated with branch 1 (i.e., call leg) contains a message body of the user agent 103. Conventionally, an ACK message would not contain a message body, as the corresponding INVITE already provided the information. It is noted that the messages that are exchanged between the SFP server 109 and the BUA 107 can be forwarded by intervening proxies, as these messages individually are standardized messages. Consequently, deployment costs associated with the SFP server 109 and the BUA 107 are minimized by avoiding interoperability issues.

At this point, a media path (or call leg) is established between the user agent 101 and the BUA 107; another media path formed between the BUA 107 and the user agent 103. The above call establishment advantageously provides a more efficient exchange of messages, resulting in improved user response time and reduced traffic. Also, from the perspective of the user agents 101, 103, all the message exchanges are standard SIP messaging, thus, negating the need for software extensions or modifications.

To terminate the session, the user agent 103 send a BYE message to the SFP server 109, per step 317. In step 319, the SFP server 109 forwards the BYE message to the user agent 101. Thereafter, the user agent 101 transmits a 200 OK message to the SFP server 109 (step 321). The BYE message is then forwarded to the BUA 107 by the SFP server 109, per step 323. In response, the BUA 107 sends a 200 OK message to the SFP server 109 (step 325), which then transmits a 200 OK to the user agent 103 (step 327).

Table 1 shows the details associated with the session establishment, shown as steps 301-315 of FIG. 3.

TABLE 1

| SIP Device | Message Details |
| --- | --- |
| calling user agent -> Special Forking Proxy | INVITE sip:UA2@domain2.com SIP/2.0<br>Via SIP/2.0/UDP domain1.com<br>To: <sip:UA2@domain2.com><br>From: <sip:UA1@domain1.com><br>Call-ID: 1@domain1.com<br>CSeq: 1024 INVITE<br>Contact: <sip:UA1@domain1.com><br>Content-Type: application/sdp<br>Content-Length: . . .<br>sdp 1 |

TABLE 1-continued

| SIP Device | Message Details |
|---|---|
| Special Forking Proxy -> bridging user agent | INVITE sip:BUA@domain3.com SIP/2.0<br>Via SIP/2.0/UDP specialproxy.domain3.com;<br>branch=1<br>Via SIP/2.0/UDP domain1.com<br>To: <sip:UA2@domain2.com><br>From: <sip:UA1@domain1.com><br>Call-ID: 1@domain1.com<br>CSeq: 1024 INVITE<br>Content-Type: application/sdp<br>Content-Length: . . .<br>sdp 1 |
| bridging user agent -> Special Forking Proxy | SIP/2.0 200 OK<br>Via SIP/2.0/UDP<br>specialproxy.domain3.com; branch=1<br>Via SIP/2.0/UDP domain1.com<br>To: <sip:UA2@domain2.com>; tag=1<br>From: <sip:UA1@domain1.com><br>Call-ID: 1@domain1.com<br>CSeq: 1024 INVITE<br>Content-Type: multipart/mime<br>Content-Length: . . .<br>sdp b1<br>sdp b2 |
| Special Forking Proxy -> called user agent | INVITE sip:UA2@domain2.com SIP/2.0<br>Via SIP/2.0/UDP specialproxy.domain3.com; branch=2<br>Via SIP/2.0/UDP domain1.com<br>To: <sip:UA2@domain2.com><br>From: <sip:UA1@domain1.com><br>Call-ID: 1@domain1.com<br>CSeq: 1024 INVITE<br>Record-Route:<br><sip:UA2@domain2.com;maddr=specialproxy.domain3.com><br>Contact: <sip:UA1@domain1.com><br>Content-Type: application/sdp<br>Content-Length: . . .<br>sdp b2 |
| called user agent -> Special Forking Proxy | STP/2.0 200 OK<br>Via SIP/2.0/UDP specialproxy.domain3.com; branch=2<br>Via SIP/2.0/UDP domain1.com<br>To: <sip:UA2@domain2.com>; tag=2<br>From: <sip:UA1@domain1.com><br>Call-ID: 1@domain1.com<br>CSeq: 1024 INVITE<br>Record-Route:<br><sip:UA2@domain2.com;maddr=specialproxy.domain3.com><br>Contact: <sip:UA2@domain2.com><br>Content-Type: application/sdp<br>Content-Length: . . .<br>sdp 2 |
| Special Forking Proxy -> calling user agent | SIP/2.0 200 OK<br>Via SIP/2.0/UDP domain1.com<br>To: <sip:UA2@domain2.com>; tag=2<br>From: <sip:UA1@domain1.com><br>Call-ID: 1@domain1.com<br>CSeq: 1024 INVITE<br>Record-Route:<br><sip:UA2@domain2.com;maddr=specialproxy.domain3.com><br>Contact: <sip:UA2@domain2.com><br>Content-Type: application/sdp<br>Content-Length: . . .<br>sdp b1 |
| calling user agent -> Special Forking Proxy | ACK sip:UA2@domain2.com SIP/2.0<br>Via SIP/2.0/UDP domain1.com<br>To: <sip:UA2@domain2.com>; tag=2<br>From: <sip:UA1@domain1.com><br>Route: <sip:UA2@domain2.com><br>Call-ID: 1@domain1.com<br>CSeq: 1024 ACK<br>Content-Length: 0 |

TABLE 1-continued

| SIP Device | Message Details |
|---|---|
| Special Forking Proxy -> bridging user agent | ACK sip:BUA@domain3.comSIP/2.0<br>Via SIP/2.0/UDP specialproxy.domain3.com; branch=1<br>Via SIP/2.0/UDP domain1.com<br>To: <sip:UA2@domain2.com>; tag=1<br>From: <sip:UA1@domain1.com><br>Call-ID: 1@domain1.com<br>CSeq: 1024 ACK<br>Content-Type: application/sdp<br>Content-Length: . . .<br>sdp2 |
| Special Forking Proxy -> called user agent | ACK sip:UA2@domain2.com SIP/2.0<br>Via SIP/2.0/UDP specialproxy.domain3.com; branch=2<br>Via SIP/2.0/UDP domain1.com<br>To: <sip:UA2@domain2.com>; tag=2<br>From: <sip:UA1@domain1.com><br>Call-ID: 1@domain1.com<br>CSeq: 1024 ACK<br>Content-Length: 0 |

Table 2 shows the details of the session teardown, corresponding to steps 317-327 of FIG. 3.

TABLE 2

| SIP Device | Message Details |
|---|---|
| called user agent -> Special Forking Proxy | BYE sip:UA1@domain1.com SIP/2.0<br>Via SIP/2.0/UDP domain2.com<br>To: <sip:UA1@domain1.com><br>From: <sip:UA2@domain2.com>; tag=2<br>Call-ID: 1@domain1.com<br>CSeq: 64 BYE<br>Content-Length: 0 |
| Special Forking Proxy -> calling user agent | BYE sip:UA1@domain1.com SIP/2.0<br>Via SIP/2.0/UDP specialproxy.domain3.com; branch=1<br>Via SIP/2.0/UDP domain2.com<br>To: <sip:UA1@domain1.com><br>From: <sip:UA2@domain2.com>; tag=2<br>Call-ID: 1@domain1.com<br>CSeq: 64 BYE<br>Route: <sip:UA1@domain1.com><br>Record-Route:<br><sip:UA1@domain1.com;maddr=specialproxy.domain3.com><br>Content-Length: 0 |
| calling user agent -> Special Forking Proxy | SIP/2.0 200 OK<br>Via SIP/2.0/UDP specialproxy.domain3.com; branch=1<br>Via SIP/2.0/UDP domain2.com<br>To: <sip:UA1@domain1.com><br>From: <sip:UA2@domain2.com>; tag=2<br>Call-ID: 1@domain1.com<br>CSeq: 64 BYE<br>Record-Route:<br><sip:UA1@domain1.com;maddr=specialproxy.domain3.com><br>Content-Length: 0 |
| Special Forking Proxy -> bridging user agent | BYE sip:BUA@domain3.com SIP/2.0<br>Via SIP/2.0/UDP specialproxy.domain3.com; branch=2<br>Via SIP/2.0/UDP domain2.com<br>To: <sip:UA1@domain1.com><br>From: <sip:UA2@domain2.com>; tag=1<br>Call-ID: 1@domain1.com<br>CSeq: 64 BYE<br>Record-Route:<br><sip:UA1@domain1.com;maddr=specialproxy.domain3.com><br>Content-Length: 0 |
| bridging user agent -> Special Forking Proxy | SIP/2.0 200 OK<br>Via SIP/2.0/UDP specialproxy.domain3.com; branch=2<br>Via SIP/2.0/UDP domain2.com<br>To: <sip:UA1@domain1.com><br>From: <sip:UA2@domain2.com>; tag=1<br>Call-ID: 1@domain1.com<br>CSeq: 64 BYE<br>Content-Length: 0 |

TABLE 2-continued

| SIP Device | Message Details |
| --- | --- |
| Special Forking Proxy -> called user agent | SIP/2.0 200 OK<br>Via SIP/2.0/UDP domain2.com<br>To: <sip:UA1@domain1.com><br>From: <sip:UA2@domain2.com>; tag=2<br>Call-ID: 1@domain1.com<br>CSeq: 64 BYE<br>Content-Length: 0 |

A number of implementation considerations are now described regarding the network services that are provided by the system 100. With respect to the Anonymizer service, the special forking proxy server 109 change the To, From, Call-ID and remove the Contact headers from the initial INVITE before forwarding it to the called user agent (which in this example is user agent 103). For example, the message from the special forking proxy server 109 to the called user agent 103 is as follows (below in Table 3):

TABLE 3

| STP Device | Message Details |
| --- | --- |
| Special Forking Proxy -> called user agent | INVITE sip:UA2@domain2.com SIP/2.0<br>Via SIP/2.0/UDP specialproxy.domain3.com; branch=2<br>Via SIP/2.0/UDP a84jd21dj2lk38djlldlgdlf<br>To: <sip:UA2@domain2.com><br>From: <sip:anonymous@domain3.com><br>Call-ID: 39klds184ldfk0@domain3.com<br>CSeq: 1024 INVITE<br>Record-Route:<br><sip:UA2@domain2.com;maddr=specialproxy.domain3.com><br>Content-Type: application/sdp<br>Content-Length: . . .<br>sdp b2 |

It is noted that references to domain1 have been removed, including the information in sdp 1; thus, the call is placed anonymously. The special forking proxy server 109 then needs to make these changes for all messages proxied between the called user agent 103 and the calling user agent 101.

To implement Codec Conversion service, sdp 1 and sdp 2 contain a non-intersecting set of codecs. The special forking proxy server 109 might try proxying the initial INVITE from the calling user agent 101 to the called user agent 103. The called user agent 103 then responds with a 420 Not Supported response listing the supported codecs. The special forking proxy server 109 then automatically implements the Codec Conversion service by forking the initial INVITE to the bridging user agent 107. Thus, there exists intersecting codecs in sdp 1 and sdp b1 and in sdp 2 and sdp b2, which would allow the session to take place.

As for the Network Bridging service, sdp 1 and sdp 2 would contain non-intersecting media transports. The special forking proxy server 109 accordingly proxies the initial INVITE from the calling user agent 101 to the called user agent 103. The called user agent 103 then responds with a 420 Not Supported response listing the supported media transports. The special forking proxy server 109 then automatically implements the Network Bridging service by forking the initial INVITE to the bridging user agent 107l. As a result, there exists intersecting media transports in sdp 1 and sdp b1 and in sdp 2 and sdp b2, permitting the session to take place.

Turning now to the Firewall service, the bridging user agent 107 is permitted by the firewall to send and receive signaling and media packets, as shown in FIG. 4.

FIG. 4 is a diagram of a communication system utilizing a special forking SIP to perform firewall services, according to an embodiment of the present invention. A Firewall 401 is placed between the user agent 101 and the IP network 105. In this example, the special forking proxy server 109, upon receipt of an INVITE request, checks the policy of the Firewall 401 to determine if the user agents 101, 103 are permitted to establish a session. If so, the session progresses with the INVITE forked. If not permitted, the special forking proxy server 109 returns a 403 Forbidden response, and the Firewall policy has been successfully enforced.

Figure 5:
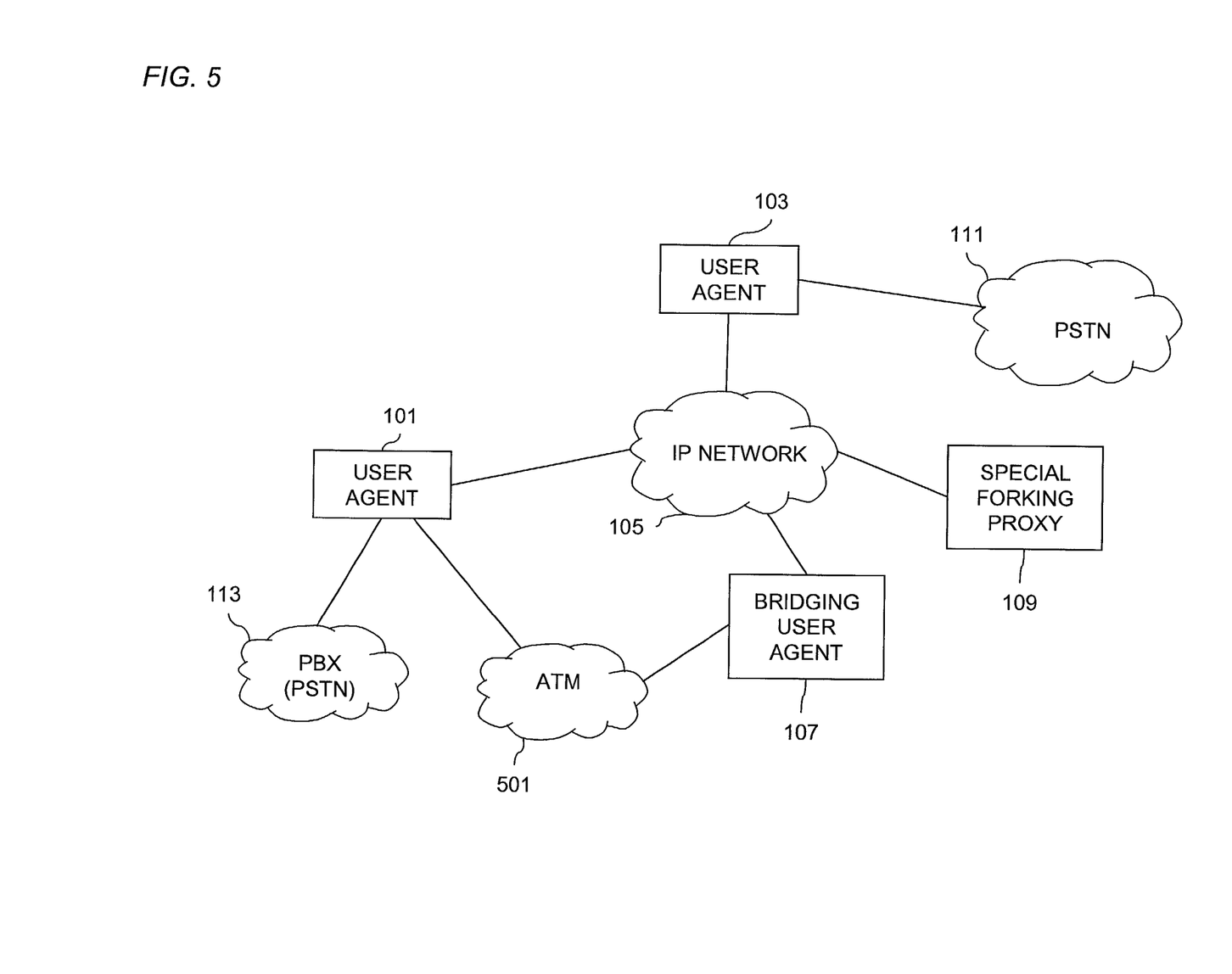
FIG. 5 is a diagram of a communication system in which a user agent communicates with a bridging user agent over a data network, according to an embodiment of the present invention.

FIG. 5 is a diagram of a communication system in which a user agent communicates with a bridging user agent over a data network, according to an embodiment of the present invention. The data network 501, in an exemplary embodiment, is an ATM (Asynchronous Transfer Mode) network that provides connectivity for the user agent 101 to communicate with the BUA 107. Because of the decoupling of the media component from the signaling component, according to an embodiment of the present invention, the media component can be transmitted over the ATM network 501, while the signaling is handled through the IP network 105. In this manner, once the signaling is performed through the relatively slow IP network 105, the information exchange rate is greatly enhanced by use of the high-speed ATM network 501.

Figure 6:
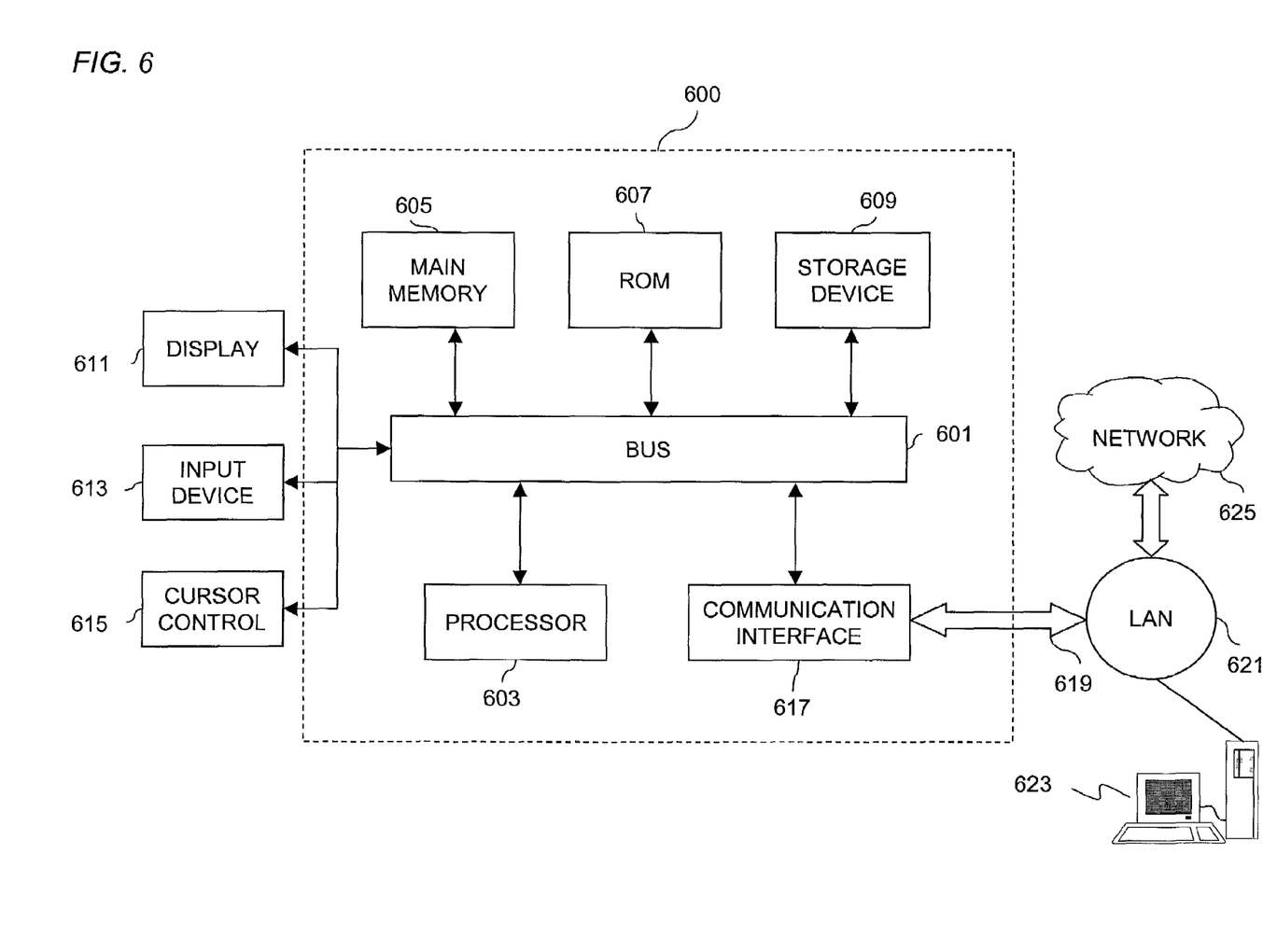
FIG. 6 is a diagram of a computer system that can be used to implement an embodiment of the present invention.

FIG. 6 illustrates a computer system 600 upon which an embodiment according to the present invention can be implemented. The computer system 600 includes a bus 601 or other communication mechanism for communicating information, and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions to be executed by the processor 603. The computer system 600 further includes a read only memory (ROM) 607 or other static storage device coupled to the bus 601 for storing static information and instructions for the processor 603. A storage device 609, such as a magnetic disk or optical disk, is additionally coupled to the bus 601 for storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is cursor control 615, such as a mouse, a trackball, or cursor direction keys for communicating direction information and command selections to the processor 603 and for controlling cursor movement on the display 611.

According to one embodiment of the invention, the BUA and Special Forking Proxy functionalities are provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, or a telephone modem to provide a data communication connection to a corresponding type of telephone line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although only a single communication interface 617 is shown, it is recognized that multiple communication interfaces may be employed to communicate with different networks and devices.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by service provider. The local network 621 and network 625 both use electrical, electromagnetic, or optical signals to convey information and instructions. The signals through the various networks and the signals on network link 619 and through communication interface 617, which communicate digital data with computer system 600, are exemplary forms of carrier waves bearing the information and instructions.

The computer system 600 can send messages and receive data, including program code, through the network(s), network link 619, and communication interface 617. In the Internet example, a server (not shown) might transmit requested code belonging an application program for implementing an embodiment of the present invention through the network 625, local network 621 and communication interface 617. The processor 603 may execute the transmitted code while being received and/or store the code in storage device 69, or other non-volatile storage for later execution. In this manner, computer system 600 may obtain application code in the form of a carrier wave.

The term "computer-readable medium" as used herein refers to any medium that participates in providing instructions to the processor 604 for execution. Such a medium may take many forms including but not limited to storage media such as non-volatile media, volatile media, and transmission media. Non-volatile media include, for example optical or magnetic disks, such as storage device 609. Volatile media include dynamic memory, such as main memory 605. Transmission media include coaxial cables, copper wire and fiber optics, including the wires that comprise bus 601. Transmission media can also take the form of acoustic, optical, or electromagnetic waves, such as those generated during radio frequency (RF) and infrared (IR) data communications. Common forms of computer-readable storage media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge; transmission media include, for example a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, a communication system that provides voice processing support a number of network services, including an anonymizer service, a Codec Conversion service, a network bridging service, and a firewall service. According to one embodiment of the present invention, the network elements are SIP devices; i.e., a bridging user agent and a special forking proxy server. The BUA permits four SDP message bodies are exchanged in a single transaction (e.g., an INVITE/200 OK/ACK exchange) to bridge two call legs. The SFP server communicates with the BUA using standard SIP messages; the SFP server forks all requests, including, for example, ACKs and BYEs. The above approach advantageously enhances scalability, while maintaining a standardized architecture.

While the present invention has been described in connection with a number of embodiments and implementations, the present invention is not so limited but covers various obvious modifications and equivalent arrangements, which fall within the purview of the appended claims.

What is claimed is:

1. A method for supporting voice processing over a packet switched network, the method comprising:
   receiving an invite message for establishing a first packet switched communication session leg between a calling user agent and the packet switched network and a second packet switched communication session leg between a called user agent and the packet switched network; and
   in response to the invite message, establishing, via a network element, a bridge between the first packet switched communication session leg and the second packet switched communication session, respectively, wherein the establishing step comprises:
   forking an acknowledgement message from the calling user agent, the acknowledgement message containing a plurality of message bodies, respectively to the network element and the called user agent.

2. A method according to claim 1, wherein one of the message bodies comprises a first payload corresponding to the first communication session leg, and the establishing step further comprises:
   receiving a first response from the network element, the first response containing the first payload and a second payload that corresponds to the second communication session leg;
   transmitting another message that contains the second payload to the called user agent;
   receiving a second response that contains the second payload from the called user agent; and
   forwarding the second response to the calling user agent.

3. A method according to claim 1, further comprising:
   receiving a terminating message from the called user agent for terminating the first communication session; and
   forwarding another message to the network element for terminating the second communication.

4. A method according to claim 1, wherein the invite message conforms with a Session Initiation Protocol.

5. A method according to claim 1, wherein the network element in the establishing step supports at least one of an anonymizer service, a Codec Conversion service, a network bridging service, and a firewall service.

6. A communication system for providing voice processing over a packet switched network, the communication system comprising:
   a first network element configured to receive a message in a packet switched format for establishing a packet switched communication session between a calling user agent and a called user agent, the message having a first payload corresponding to a first call leg; and
   a second network element configured to communicate in packet switched format with the first network element and to generate a response that contains the first payload and a second payload that corresponds to a second call leg,
   wherein the second network element is configured to bridge the first call leg and the second call leg to establish a session between the calling user agent and the called user agent, and the first network element is configured to fork an acknowledgement message from the calling party to the second network element and the called user agent to acknowledge the session establishment by the called user agent, the acknowledgement message containing a plurality of message bodies.

7. A system according to claim 6, wherein first network element and the second network element are configured to conform with a Session Initiation Protocol.

8. A system according to claim 7, wherein the second network element comprises a plurality of user agents that are identified by a single address.

9. A system according to claim 6, wherein first network element and the second network element support at least one of an anonymizer service, a Codec Conversion service, a network bridging service, and a firewall service.

10. A network apparatus for supporting voice processing over a packet switched network, the apparatus comprising:
    a communication interface configured to receive, from the packet switched network, a message for establishing a session between a calling user agent and a called user agent; and
    a processor coupled to the communication interface and configured to establish the session via a bridging user agent that is configured to bridge a first packet switched call leg and a second packet switched call leg associated with the calling user agent and the called user agent, respectively, wherein the processor is configured to fork a message acknowledging establishment of the session from the calling user agent to the network element and the called user agent, the message containing a plurality of message bodies.

11. An apparatus according to claim 10, wherein the processor is configured to conform with a Session Initiation Protocol.

12. An apparatus according to claim 11, wherein the bridging user agent comprises a plurality of user agents that are identified by a single address.

13. An apparatus according to claim 10, wherein the processor is configured to support at least one of an anonymizer service, a Codec Conversion service, a network bridging service, and a firewall service.

14. A network apparatus for supporting voice processing over a packet switched network, the apparatus comprising:
    a communication interface configured to receive, from the packet switched network, a message for establishing a session between a calling user agent and a called user agent from a proxy server; and
    a processor coupled to the communication interface and configured to establish the session by bridging a first packet switched call leg and a second packet switched call leg associated with the calling user agent and the called user agent, respectively,
    wherein the proxy server is configured to fork a message acknowledging establishment of the session from the calling user agent to the network element and the called user agent, the message containing a plurality of message bodies.

15. An apparatus according to claim 14, wherein the processor is configured to conform with a Session Initiation Protocol.

16. An apparatus according to claim 14, wherein the processor is configured to support at least one of an anonymizer service, a Codec Conversion service, a network bridging service, and a firewall service.

17. A network apparatus for providing voice processing over a packet switched network, the network apparatus comprising:
- means for receiving a packet switched message for establishing a packet switched communication session between a calling user agent and a called user agent; and
- means for establishing the session via a network element configured to bridge a first packet switched call leg and a second packet switched call leg associated with the calling user agent and the called user agent, respectively, wherein the establishing means comprises:
- means for forking a message acknowledging establishment of the session from the calling user agent to the network element and the called user agent, the message containing a plurality of message bodies.

18. A network apparatus according to claim 17, wherein the message for session establishment has a first payload corresponding to the first call leg, the establishing means further comprising:
- means for receiving a first response from the network element, the response containing the first payload and a second payload that corresponds to the second call leg;
- means for transmitting another message that contains the second payload to the called user agent;
- means for receiving a second response that contains the second payload from the called user agent; and
- means for forwarding the second response to the calling user agent.

19. A network apparatus according to claim 18, wherein the forking means generates a plurality of acknowledgement messages, one of the plurality of acknowledgement messages being sent to the network element, the one acknowledgement message containing the second payload, another one of the plurality of acknowledgement messages being sent to the called user agent.

20. A network apparatus according to claim 17, further comprising:
- means for receiving a message for terminating the session from the called user agent, the message for terminating the session being associated with the first call leg; and
- means for forwarding another message for terminating the session associated with the second call leg to the network element.

21. A network apparatus according to claim 17, wherein the message for establishing the session conforms with a Session Initiation Protocol.

22. A network apparatus according to claim 17, wherein the network element supports at least one of an anonymizer service, a Codec Conversion service, a network bridging service, and a firewall service.

23. A computer-readable storage medium carrying one or more sequences of one or more instructions for providing voice processing over a packet switched network, the one or more sequences of one or more instructions including instructions which, when executed by one or more processors, cause the one or more processors to perform the steps of:
- receiving a message for establishing a session in packet switched format between a calling user agent and a called user agent; and
- establishing the session via a network element configured to bridge a first call leg and a second call leg associated with the calling user agent and the called user agent, respectively, wherein the establishing step comprises,
- forking a message acknowledging establishment of the session from the calling user agent to the network element and the called user agent, the message containing a plurality of message bodies.

24. A computer-readable storage medium according to claim 23, wherein the message for session establishment has a first payload corresponding to the first call leg, the establishing step further comprising:
- receiving a first response from the network element, the response containing the first payload and a second payload that corresponds to the second call leg;
- transmitting another message that contains the second payload to the called user agent;
- receiving a second response that contains the second payload from the called user agent; and
- forwarding the second response to the calling user agent.

25. A computer-readable storage medium according to claim 24, wherein the forking step comprises:
- generating a plurality of acknowledgement messages, one of the plurality of acknowledgement messages being sent to the network element, the one acknowledgement message containing the second payload, another one of the plurality of acknowledgement messages being sent to the called user agent.

26. A computer-readable storage medium according to claim 23, wherein the one or more processors further perform the steps of:
- receiving a message for terminating the session from the called user agent, the message for terminating the session being associated with the first call leg; and
- forwarding another message for terminating the session associated with the second call leg to the network element.

27. A computer-readable storage medium according to claim 23, wherein the message for establishing the session in the receiving step conforms with a Session Initiation Protocol.

28. A computer-readable storage medium according to claim 23, wherein the network element in the establishing step supports at least one of an anonymizer service, a Codec Conversion service, a network bridging service, and a firewall service.

29. A method for supporting voice processing over a packet network, the method comprising:
- receiving a message for establishing a packet switched communication session between a calling user agent and a called user agent; and
- establishing the session via a bridging agent configured to bridge a first packet switched call leg and a second packet switched call leg associated, respectively, with the calling user agent and the called user agent, wherein the establishing step comprises concurrently forwarding an acknowledgment message to the bridging agent and the called user agent for acknowledging establishment of the session, the acknowledgement message containing a plurality of message bodies.

* * * * *